United States Patent Office 3,644,545
Patented Feb. 22, 1972

3,644,545
IMPROVED VAPOR PHASE FLUORINATION PROCEDURE IN THE PRESENCE OF CATALYST AND ALKALI METAL FLUORIDE
Walter R. Buckman, Wilmington, Del., assignor to Allied Chemical Corporation, New York, N.Y.
No Drawing. Filed June 20, 1968, Ser. No. 738,412
Int. Cl. C07c 19/08, 19/20
U.S. Cl. 260—653.7                              8 Claims

ABSTRACT OF THE DISCLOSURE

High conversions of fluorinated hydrocarbons are obtained by reacting saturated, aliphatic halocarbon starting materials containing at least one chlorine atom and no atoms other than C, H, F or Cl, with HF, in the presence of a catalyst and also in the presence of an alkali metal fluoride.

BACKGROUND OF THE INVENTION

It is known to replace chlorine atoms with fluorine atoms in saturated halocarbon compositions containing the same, by use of HF in the presence of a catalyst.

Some chlorine containing halocarbons are particularly difficult to fluorinate with commercially attractive conversions. For example, in the fluorination of one-carbon halocarbons, the ease of chlorine replacement appears to be inversely porportional to the number of hydrogen atoms present, i.e. the relative ease of replacement is shown by the following relationship:

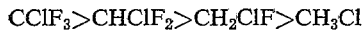

The fluorination of $CH_3Cl$ to $CH_3F$ is indeed particularly difficult and the art has, as a consequence, resorted to a number of roundabout methods for obtaining the $CH_3F$ product. Some of these other methods include the pyrolysis of other chlorofluorocarbons, the reduction of $CHBr_2F$, the decomposition of $N(CH_3)_4^+F^-$ and the reaction of KF with dimethyl sulfone. Similarly, the preparation of many other higher molecular weight halocarbons containing —$CH_2F$ groups, either require vigorous fluorination conditions resulting in poor conversions or the use of some indirect or more roundabout approach. Additionally, the preparation of perfluorinated derivatives of lesser fluorinated halocarbons becomes progressively more difficult as the molecular weights of these products increase. This phenomenon results in increasingly diminishing conversions and also in the requirement for stronger fluorinating agents.

SUMMARY OF THE INVENTION

It has now been found that substantially increased conversions of fluorinated products may be obtained, in the reaction of the corresponding lesser fluorinated halocarbon starting materials with HF, in the presence of a catalyst, when such reaction is carried out in the presence of an alkali metal fluoride. By this method, chlorine containing halocarbons which are relatively easily fluorinated with HF may be fluorinated in even higher conversions to the corresponding higher fluorinated materials. Further, chlorine containing halocarbons, which heretofore could be similarly fluorinated only with great difficulty, may now be fluorinated much more easily, in significantly higher conversions.

A further feature of the invention is that lower reaction temperatures may be employed to obtain conversions comparable to those obtained without using the inventive improvement. At reduced reaction temperatures, decomposition of reactants and products is minimized and catalyst life is prolonged.

It is accordingly an object of the invention to provide an improved fluorination procedure.

It is a more specific object of the invention to provide a means for increasing the conversions of certain chlorine containing halocarbon starting materials to higher fluorinated halocarbon products in otherwise conventional HF fluorination procedures.

Still another specific object of the invention is to provide a commercially feasible means for fluorinating certain chlorine containing halocarbons to corresponding higher fluorinated halocarbon products with HF, means has not heretofore been commercially feasible, due to considerable stability of the starting material or due to the tendency of the starting material and/or end product to decompose at the highly elevated temperatures which would otherwise be required for such a fluorination procedure.

Yet another object of the invention is to provide an improvement in certain fluorination reactions with HF in which problems of residual acid removal are simplified.

Other objects and advantages of the invention will become apparent from the following description.

The chlorine containing halocarbon starting material may be any aliphatic, saturated, straight chain or branched chain halocarbon material containing at least one chlorine tom and containing no atoms other than C, H, Cl and F. Thus, the halocarbon starting material may be polychlorinated or even perchlorinated, such as $CCl_4$. There is no known upper limitation on the number of carbon atoms which may be in the molecule, however, as noted above, in some cases, such as in the perfluorination of longer chain compounds, the reaction becomes more difficult. Nonetheless, with the improvement of the invention, the reaction will be facilitated and conversions will be increased with all the halocarbon starting materials as described above. The preferred carbon content for the halocarbon starting material is from 1–6 carbon atoms. Illustrative specific halocarbon starting materials which may be used according to the invention include the following: $CH_3Cl$, $CH_2Cl_2$, $CHCl_3$, $CCl_4$, $CCl_3F$, $CCl_2F_2$, $CHCl_2F$, $CCl_3CCl_3$ $CF_3CF_2Cl$, $CCl_2FCCl_2F$, $CCl_3CF_3$, $CHCl_2CF_3$, $CHF_3$, $CClF_2$, $CH_2ClCF_3$, $CH_3CClF_2$, $CH_3CF_2CCl_2$ and $CF_3(CF_2)_4CClF_2$.

The catalyst employed may be any of the well known catalysts employed in the art for catalyzing the replacement of chlorine atoms by fluorine atoms with HF. Illustrative of such catalysts are $Cr_2O_3$, $CrF_3$ and $AlF_3$. Other suitable catalysts will readily occur to those skilled in the art. The particular catalyst employed is not critical and is not a part of this invention. The preferred catalysts are of the chromium type such as $Cr_2O_3$ and $CrF_3$, particularly $Cr_2O_3$.

As indicated above, any alkali metal fluoride or alkaline earth metal fluoride is suitable for use in accordance with the invention. Particularly effective are KF, and NaF. NaF is preferred because of its cheapness and availability. The alkali metal fluoride (hereafter referred to as metal fluoride) may be used in any convenient form. Many of these materials are commercially available in pellitized or granular form and may be conveniently utilized as such. If desired, the metal fluoride pellets or granules may be conveniently incorporated with the catalyst particles. Mixing of the metal fluoride and catalyst particles is not required, however.

The amount of metal fluoride required is from about 0.8 to 1.2 mole per chlorine atom which is to be replaced in the halocarbon starting material. Smaller quantities of metal fluoride may be employed, but with progressively diminishing results. Larger quantities of metal fluoride may be employed without significant operating advantage but at an economic penalty. On the basis of HF employed, the molar ratio of metal fluoride to HF, corresponding to the above-indicated quantities, is generally from about 0.1:10.0, with the preferred molar ratio of metal fluoride to HF being from about 0.2:2.0.

One of the advantages of the invention is that with the use of metal fluoride in the reaction; it has been found that the reaction can be efficiently carried out with a smaller charge of HF than would ordinarily be required and in fact may even be carried out in the presence of a substantial stoichiometric deficient charge of HF, thus facilitating purification of the sought-for product from excess HF reactant or from HCl by-product formed. It has been found, that using metal fluoride according to the invention for the replacement of one chlorine atom, for example; a charge of HF, as much as 50% stoichiometrically deficient, may be employed while still obtaining at least equivalent or better conversions to the fluorinated derivative.

The fluorination reaction may be run batch-wise, semi-continuously or continuously. The improvement of the invention is particularly useful in continuous type reactions due to the substantially higher one-pass conversions which are obtainable. It has been found that use of metal fluorides, as described in the subject reactions, can result in the attainment of over 60% increases in one-pass conversions over those conversions obtained in the same reaction and under the same conditions when metal fluorides are not so employed. Since increases in one-pass conversions result in corresponding increases in the throughputs of commercial reactors and the capacities of the same; it is obvious that the improvement of the invention has substantial commercial significance.

The fluorination reaction may be conducted as a reaction, vapor phase reaction or as a fluidized bed modified vapor phase. In the case of fluidized bed reactions, the metal fluoride may be conveniently employed in powder form.

The conditions of the reaction, particularly those of temperature and pressure, can be those which are normally used in the particular fluorination procedure chosen for the preparation of a woven product. As noted above however, due to the fact that increased or equivalent conversions are obtainable at lower temperatures for a given reaction, lower temperatures can ordinarily be employed to favor stability of reactants and products and to prolong catalyst life. Additionally, since increased conversions are obtained, reaction or contact times for a least equivalent or even greater conversions will be less than would ordinarily be required.

Product recovery is as is conventional in this art and normally most effectively accomplished by ordinary distillation.

DESCRIPTION OF THE PREFERRED EMBODIMENT AS COMPARED WITH THE PRIOR ART

In the following examples parts and percentages are by weight unless otherwise indicated.

Example 1

A tubular reactor consisting of a one inch diameter Inconel (TM) pipe, eighteen inches long and having a ⅛ inch diameter Inconel (TM) thermowell, is charged with 76 g. of $Cr_2O_3$ which is obtained by tabletting commercially available hydrated chrome oxide and drying the pellets at about 200° C. in a stream of nitrogen gas. The reactor is then heated to 260° C. and an equimolar mixture of 20.5 g. HF and 87.2 g. $CH_2Cl_2$ is fed through the reactor at a flow rate of 0.9 g./min. Residence time of the HF/$CH_2Cl_2$ mixture in the reactor is 10 seconds. The exit gases from the reactor are analyzed by gas chromatography. 13.3 g. of $CH_2F_2$ and 9.8 g. of $CH_2ClF$ are obtained over a period of three hours, representing a one-pass conversion of 39% of the $CH_2Cl_2$ charged. The reaction of $CH_2Cl_2$ with HF to produce $CH_2F_2$ is efficiently carried out at temperatures between about 150–350° C.

Example 2

The procedure of Example 1 is repeated in the same apparatus under identical conditions excepting that 80 g. of NaF are charged in alternate layers with the $Cr_2O_3$ catalyst to the reactor. The exit gases are analyzed as before and there are recovered 19.7 g. of $CH_2F_2$ and 17.5 g. of $CH_2ClF$ over the three hour period, representing a one-pass conversion of 62% of the $CH_2Cl_2$ charged.

When other starting materials within the scope of the invention are employed with NaF or any other metal fluoride within the scope of the invention, optionally with other catalysts, such as $CrF_3$ or $AlF_3$, substantially the same results are obtained, that is to say significantly higher conversions are obtained as compared with runs carried out identically except that the metal fluoride is omitted.

It is to be understood that the above description is for illustrative purposes only and whereas specific embodiments have been particularly described in detail, modifications and variations may be made without departing from the scope and spirit of the invention as defined in the appended claims.

I claim:
1. In a method wherein a saturated, aliphatic, halocarbon starting material containing from 1 to 6 carbon atoms, at least one chlorine atom and no atoms other than C, H, F or Cl is reacted with HF in the vapor phase in the presence of a catalyst selected from $Cr_2O_3$, $CrF_3$ and $AlF_3$ to produce a saturated, aliphatic, halocarbon product material possessing a higher fluorine content than said starting material; the improvement which comprises carrying out the reaction in the presence of an alkali metal fluoride at a temperature in the range of about 150 to 350° C.

2. The method according to claim 1 in which the catalyst is a chromium catalyst.

3. The method according to claim 2 in which the chromium catalyst is $Cr_2O_3$.

4. The method according to claim 2 in which the chromium catalyst is $CrF_3$.

5. The method according to claim 3 wherein the reaction is carried out in the presence of from about 0.8 to 1.2 moles of alkali metal fluoride for each chlorine atom present in the starting material.

6. The method according to claim 3 in which the reaction is carried out in the presence of NaF.

7. The process according to claim 3 in which the starting material is $CH_2Cl_2$, and the product material is $CH_2F_2$.

8. The process according to claim 6 in which the starting material is $CH_2Cl_2$ and the product material is $CH_2F_2$.

References Cited

UNITED STATES PATENTS

| | | | |
|---|---|---|---|
| 2,576,823 | 11/1951 | Benning et al. | 260—653.7 |
| 3,235,612 | 2/1966 | Anello et al. | 260—653.7 |

FOREIGN PATENTS

| | | | |
|---|---|---|---|
| 535,755 | 1/1957 | Canada | 260—653.7 |
| 580,140 | 8/1946 | Great Britain | 260—653.7 |

OTHER REFERENCES

Abstract of application Ser. No. 779,219, published October 1950.

DANIEL D. HORWITZ, Primary Examiner

U.S. Cl. X.R.

252—441